(12) United States Patent
Moloney

(10) Patent No.: US 9,223,575 B2
(45) Date of Patent: Dec. 29, 2015

(54) PROCESSOR EXPLOITING TRIVIAL ARITHMETIC OPERATIONS

(75) Inventor: David Moloney, Dublin (IE)

(73) Assignee: LINEAR ALGEBRA TECHNOLOGIES LIMITED, Dublin (IE)

( * ) Notice: Subject to any disclaimer, the term of this patent is extended or adjusted under 35 U.S.C. 154(b) by 724 days.

(21) Appl. No.: 12/531,408

(22) PCT Filed: Mar. 16, 2008

(86) PCT No.: PCT/EP2008/053134
§ 371 (c)(1),
(2), (4) Date: Sep. 15, 2009

(87) PCT Pub. No.: WO2008/110634
PCT Pub. Date: Sep. 18, 2008

(65) Prior Publication Data
US 2010/0106947 A1    Apr. 29, 2010

Related U.S. Application Data

(60) Provisional application No. 60/911,274, filed on Apr. 11, 2007.

(30) Foreign Application Priority Data

Mar. 15, 2007   (GB) .................................. 0704999.2

(51) Int. Cl.
*G06F 9/30*     (2006.01)

(52) U.S. Cl.
CPC .......... *G06F 9/30101* (2013.01); *G06F 9/3001* (2013.01)

(58) Field of Classification Search
CPC   G06F 9/30192; G06F 9/30101; G06F 9/3001
USPC .......................................... 712/226, 209, 220
See application file for complete search history.

(56) References Cited

U.S. PATENT DOCUMENTS

| 5,262,973 | A | | 11/1993 | Richardson | |
|---|---|---|---|---|---|
| 6,009,511 | A | * | 12/1999 | Lynch et al. | 712/222 |
| 6,243,806 | B1 | * | 6/2001 | Koumura et al. | 712/234 |
| 7,395,297 | B2 | * | 7/2008 | Steele, Jr. | 708/525 |
| 7,502,918 | B1 | * | 3/2009 | Barowski et al. | 712/226 |

OTHER PUBLICATIONS

Atoofian et al.; "Improving Energy-Efficiency in High-Performance Processors by Bypassing Trivial Instructions"; IEE-Proc.Comput. Digit. Tech., vol. 153, No. 5, Sep. 2006.*

(Continued)

*Primary Examiner* — Benjamin Geib
(74) *Attorney, Agent, or Firm* — Marsh Fischmann & Breyfogle LLP; Kent A. Lembke

(57) ABSTRACT

The present application relates to the field of processors and in particular to the carrying out of arithmetic operations. Many of the computations performed by processors consist of a large number of simple operations. As a result, a multiplication operation may take a significant number of clock cycles to complete. The present application provides a processor having a trivial operand register, which is used in the carrying out of arithmetic or storage operations for data values stored in a data store.

14 Claims, 2 Drawing Sheets

(56) References Cited

OTHER PUBLICATIONS

M. M. Islam and P. Stenstrom; "Reduction of Energy Consumption in Processors by Early Detection and Bypassing of Trivial Operations"; 2006; IEEE.*

E. Atoofian and A. Baniasadi; "Improving Energy-Efficiency by Bypassing Trivial Computations"; 2005; IEEE.*

J. J. Yi and D. Lilja; "Improving Processor Performance by Simplifying and Bypassing Trivial Computations"; 2002; IEEE.*

S. E. Richardson; "Exploiting Trivial and Redundant Computation"; 1993; IEEE.*

McCloud, Shawn, et al., "A Floating Point Unit for the 68040" Motorola, Inc., IEEE 1990, pp. 187-190.

Richardson, Stephen E., Exploiting Trivial and Redundant Computation, IEEE 1993, Sun Microsystems Laboratories, Inc., pp. 220-227.

PCT International Search Report, PCT/EP2008/053134, mailed May 21, 2008.

* cited by examiner

PROCESSOR EXPLOITING TRIVIAL ARITHMETIC OPERATIONS

RELATED APPLICATIONS

This application is a national phase of PCT Application No. PCT/EP2008/053134, filed Mar. 16, 2008, entitled, "A PROCESSOR EXPLOITING TRIVIAL ARITHMETIC OPERATIONS," which claims priority from GB Patent Application No. GB0704999.2, filed on Mar. 15, 2007, and U.S. patent application No. US60/911,274, filed on Apr. 11, 2007, which are hereby incorporated by reference into this application.

FIELD OF THE INVENTION

The present invention relates to the field of processors and in particular to the carrying out of arithmetic operations.

BACKGROUND OF THE INVENTION

Many of the computations performed by processors consist of a large number of simple operations. As a result, a multiplication operation may take a significant number of clock cycles to complete.

Whilst this operation is justified for complex calculations, the same cannot be said of trivial operations, for example multiplication of one number by 0, +1, or −1, where the answer may be obtained in a much simpler fashion.

In certain applications, involving sparse matrices, the number of trivial operations carried out can be very significant owing to the presence of a significant number of zeros. The number of zeroes in a sparse matrix can be reduced or eliminated by storing the matrix in a sparse format such as compressed Row Storage (CRS) format, however due to the overheads in terms of address-generation such storage formats often result in very poor performance on commercial computer systems.

U.S. Pat. No. 5,262,973 (Richardson et al) discloses a method for reducing the computation time where the operation is a trivial one. In particular, the method performs at least two operations concurrently. The first operation is a conventional complex arithmetic operation. The second and further operations are performed by an operand check mechanism which determines whether one or both of the operands is a specific instance of a trivial operand. If one of the operands is a specific instance of a trivial operand, the complex arithmetic operations are halted and the check mechanism rapidly outputs the result of the arithmetic operation according to the trivial operand detected. Consequently, the need to perform complex arithmetic operations on trivial operands is avoided. The method does not however eliminate complex operations, it merely halts them if a determination is made that the operation is in fact a trivial one.

SUMMARY

A first embodiment provides a processor comprises a data store for storing data values, a trivial operand register for storing at least one flag for each data value in the data store, the at least one flag indicating whether each stored data value is a trivial operand, wherein the processor is configured to employ the trivial operand register in performing instructions. The processor may comprise a computational unit employing the trivial operand register in performing an operation involving at least one a data value from the data store. Suitably, the computational unit may comprise a control logic unit for examining the trivial operand register and controlling the operation of a calculation unit. The processor may further comprise a comparator configured to perform a comparison to determine the presence of a trivial operand on the input lines to the data store. The data store may be provided as a register-file. The processor may further comprise a plurality of comparators, each comparator determining whether the data at a corresponding write-port of the register-file comprises a trivial operand. The data values are suitably floating point values. The data store may comprise 32 bit, 64 bit or 128 bit registers. The trivial operand may comprise a 0, −1 or 1. Advantageously, the trivial operand is uniquely a 0 value.

Suitably, the performed instruction comprises a floating point calculation. A control logic unit may be provided for examining the trivial operand register and controlling the operation of a floating point calculation unit. The control logic unit may be configured to bypass the floating point calculation unit and provide a result directly where the calculation involves a trivial operand. The result may be provided directly by setting the trivial operand register flag for the register where the result was to be stored. Optionally, the performed instruction comprises a data storage instruction. The processor may further comprise a comparator configured to perform comparisons of non-zero patterns corresponding to vector or matrix data.

In a further embodiment, a method is provided for performing operations on a first data register in a processor, the processor having a trivial operand register indicating the presence of a trivial operand in the first data register comprising the step of employing the flag in the trivial operand register in the performance of an instruction involving said first data register.

Suitably, the method comprises the initial steps of writing data to a first data register, performing a comparison of the data to determine the presence of a trivial operand in the data, and setting the flag in response to the comparison within a trivial operand register. The step of writing the data and performing the comparison may be performed substantially simultaneously. The first data register may be a floating point data register. Optionally, a plurality of individual data registers are provided, each register having an associated flag in the trivial operand register. The plurality of individual data registers may be provided as a register file. Optionally, the instruction is a calculation and the trivial operand register is employed in the control the operation of a calculation unit in the processor. The trivial operand may comprise a 0, −1 or 1. In one arrangement, the trivial operand is uniquely a 0 value. The method may comprise the bypassing of a calculation unit and providing a result directly where the calculation involves a trivial operand. In this case, the result may be provided directly by setting the trivial operand register flag for the register where the result was to be stored. Optionally, the performed instruction comprises a data storage instruction.

BRIEF DESCRIPTION OF THE DRAWINGS

The present invention will now be described with reference to the accompanying drawings in which.

DETAILED DESCRIPTION OF THE DRAWINGS

The present application employs trivial operand flags to identify whether data contained within a data store might be considered a trivial operand. The data store may take the form of any kind of memory location, depending on the individual processor architecture. Nonetheless, for ease of explanation the example below will be described with reference to registers and\or register files. The application is not however intended to be restricted or limited to these particular types of data store. The contents of the flags are generated by comparisons of the floating-point values to known trivial values, or by loading the results of previous comparisons from memory, where they are stored along with the source matrix/vector data. It will be appreciated that in the context of the present application, a trivial operand is one which does not require a complex calculation process to determine the result, e.g. multiplication of two 32 bit floating bit operands where one of the operands is 0 does not require a full 32 bit multiplication process to determine that the result is zero. Trivial operands would include 1, −1 and 0.

Operands equal to an integer multiple of two may also be considered trivial operands, as a simple shift process is involved for division or multiplication at least in integer operations. It will be appreciated that the larger the number of trivial operands the greater the implementation complexity required. Accordingly, it is preferable that the flags for trivial operands be restricted to identifying whether the operand is a 1, −1 or 0.

In certain applications, the number of operations involving a 0 is considerable. An example of such an application is the field of sparse matrices, as might be employed in games physics applications or search engines, the advantage of having a single flag for each data register indicating whether the value stored in the data register is a zero or not would be considerable in terms of the potential savings in computational speed and reductions in power requirements and the associated benefits of reduced heat. The savings are particularly large when the source-matrix is used repeatedly, for instance Google's search matrix is an n x n sparse connectivity matrix, where n≈3 billion and 6-7 non-zero entries per column. Google's matrix is updated once per week and is queried thousands of times per second 24 hours per day, 365 days per year.

Figure 1:
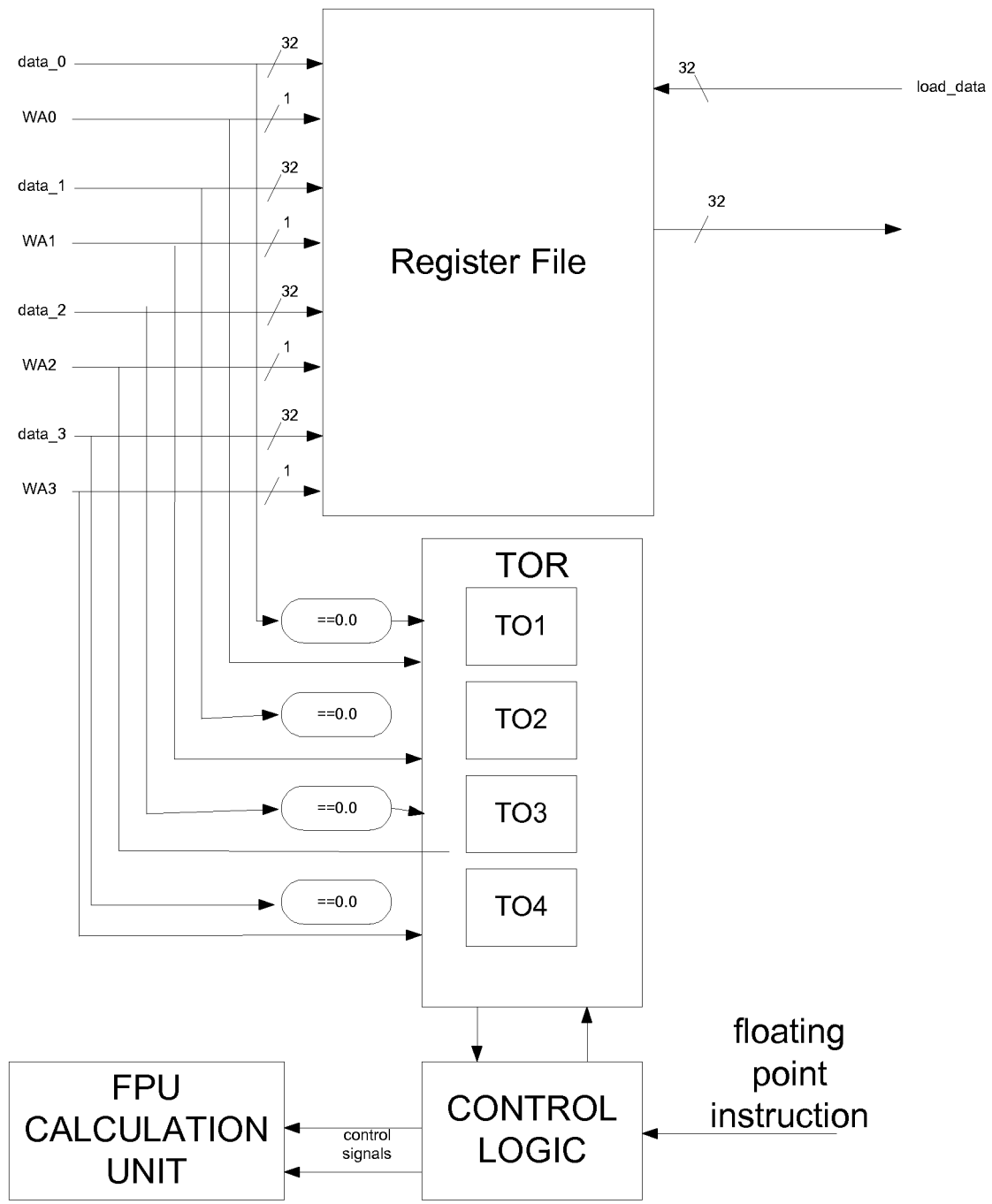
FIG. 1 is a schematic representation of a processor according to an exemplary embodiment of the invention.
Figure 2:
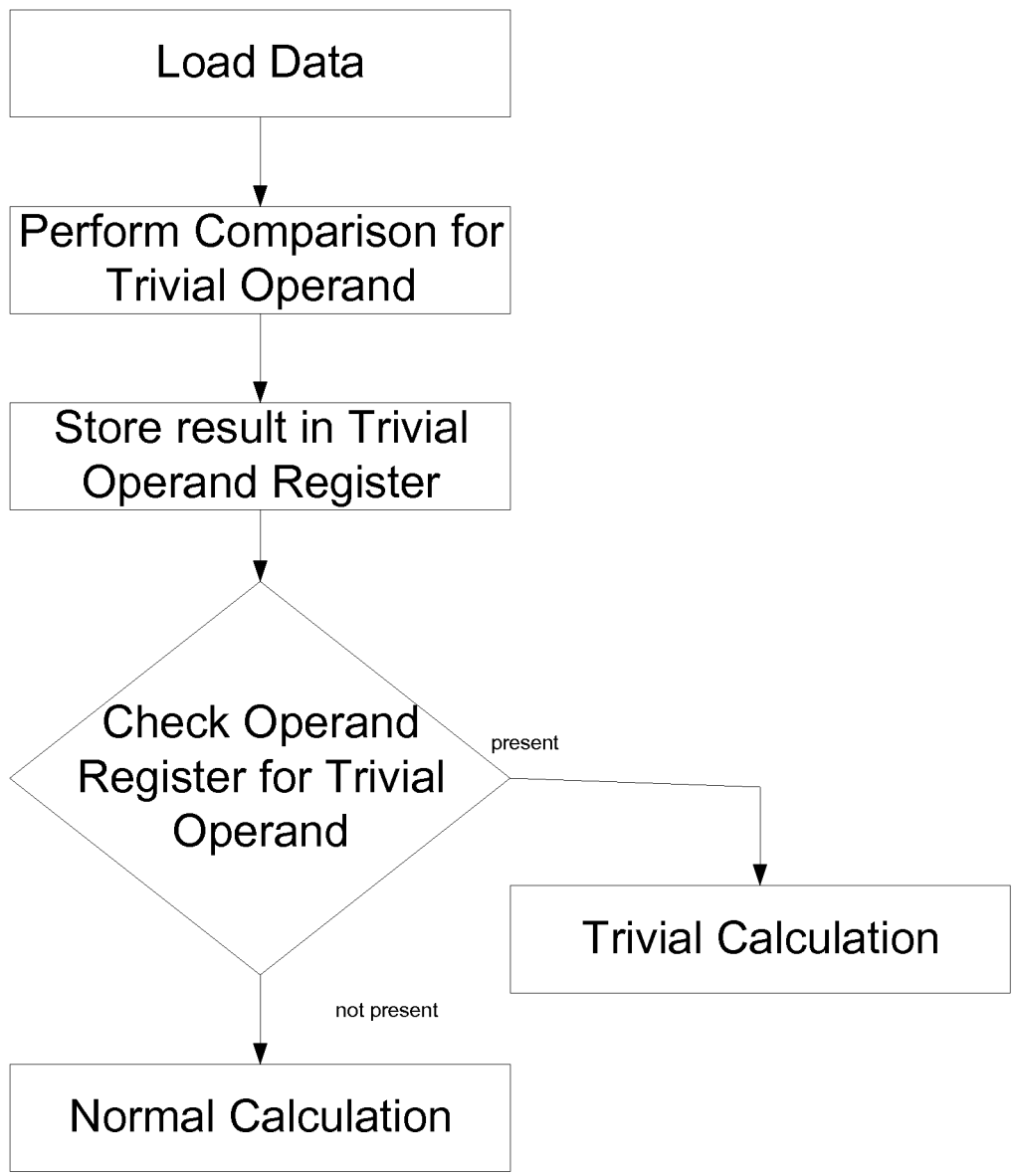
FIG. 2 is a flowchart of a method according to an exemplary embodiment of the invention.

An exemplary implementation will now be described for use with such sparse matrix applications, in which advantageously the trivial operand is determined to be a 0. The exemplary implementation, as illustrated in FIG. 1, provides a single-precision 32 bit data register application, although it will be appreciated that the exemplary method as illustrated in FIG. 2 may be applied to other configurations including double and higher precisions.

The exemplary processor has a register file having an array of registers contained therein. In the exemplary arrangement shown, there are four 32 bit registers. The register file may be implemented as a fast static RAM with multiple ports. Suitably, the register file is arranged with dedicated read and write ports rather than reading and writing through the same port. Although, the use of a register file is advantageous, the registers may be implemented less advantageously using individual flip-flops, high speed core memory, thin film memory, and other memory techniques.

As with other processors, the data for a register file may be loaded from a (floating point) computational unit after a computation and similarly data from a register file may be provided to a computational unit for use in a computation.

Each of the write ports to the register file has 32 data lines. In the case of single precision floating point numbers, the first bit is a sign bit, followed by eight bits of an exponent and 23 bits for a mantissa. 31 data lines must be compared (comparison of sign bit not required) to determine whether the value of the mantissa for that register is zero. The single bit output of the comparator is written to a corresponding bit within the trivial operand register. The writing of the output from the comparator is controlled by the write line for the write line for the register to the register file. It will be appreciated that whilst the illustration in FIG. 2 demonstrates that the loading of data occurs first, it will be appreciated that the comparison and loading may occur simultaneously. Moreover, in circumstances where the trivial operand data is stored with the data itself in memory, no comparison may be required as the trivial operand register values may be directly loaded.

An advantage of this arrangement is that no additional clock-cycles are required to perform comparisons as they are done "for free" in parallel with register-file writes.

The contents of the trivial operand register may be employed to control the operation of floating-point units in order to conserve power and/or reduce computational latency. In this arrangement, control logic may be provided to read bits from the trivial operand register corresponding to the registers for the input operands to the floating-point operation. The control signals required to control execution of the floating-point operator may then be generated according to the table below. In addition to their use in the compression/decompression of floating-point data the MCB bitmap register contents can also used

| FP operation | srcA | srcB | dst | dst_MCB |
|---|---|---|---|---|
| add (A + B) | mcb == 0 | B | B | 1 |
| | A | mcb == 0 | A | 0 |
| | mcb == 0 | mcb == 0 | 0.0 | 0 |
| sub (A − B) | mcb == 0 | B | −B | 1 |
| | A | mcb == 0 | A | 1 |
| | mcb == 0 | mcb == 0 | 0.0 | 0 |
| multiply (A * B) | mcb == 0 | B | 0.0 | 0 |
| | A | mcb == 0 | 0.0 | 0 |
| | mcb == 0 | mcb == 0 | 0.0 | 0 |
| divide (A/B) | mcb == 0 | B | 0.0 | 0 |
| | A | mcb == 0 | inf | 1 |
| square-root (A) | mcb == 0 | | 0.0 | 0 |

In practice, the proposed scheme may easily be extended to an arbitrary number of register-file write-ports and to register-files with an arbitrary number of entries.

This logic has the effect of replacing a power-hungry floating-point operation with a simple logical function which executes in a single cycle as opposed to several pipelined cycles in the case of the full floating-point operation. This has the combined of reducing power-dissipation and increasing the effective FLOPS throughput of the proposed processor when compared to a conventional processor.

In the cases where the results of a floating-point operation are zero (0.0 floating-point value) the floating-point operation need not be carried out and the trivial operand bit corresponding to the destination register in the register-file may be set to zero by appropriate logic, i.e. in some arrangements it is not necessary to write the result into the register file. In such arrangements, the processor may be adapted to employ the contents of the trivial operand register when writing data from the register file.

Although the present application is directed to conducting floating point computations, a trivial operand register may also be used for other non-computational purposes including the acceleration of data storage from the register file and the processor generally to external memory, and a test for rapid comparison of vector/matrix non-zero patterns as a precursor to performing an entry by entry comparison on a matrix which would be computationally expensive. Such an application is described in a co-pending application filed by the assignee of the present application.

The words comprises/comprising when used in this specification are to specify the presence of stated features, integers, steps or components but does not preclude the presence or addition of one or more other features, integers, steps, components or groups thereof.

The invention claimed is:

1. A processor comprising:
   a data store for storing data values, and
   a trivial operand register for storing at least one flag for each data value in the data store, the at least one flag indicating whether each stored data value is a trivial operand, wherein:
   the processor is configured to employ the trivial operand register in performing instructions;
   the data store is provided as a register-file; and
   the processor further comprises a plurality of comparators, wherein each of the comparators is connected directly to a corresponding write-port on the input lines of the register-file and wherein each of the comparators determines whether data at the corresponding write-port on input lines of the register-file comprises a trivial operand.

2. A processor according to claim 1, wherein the processor comprises a computational unit employing the trivial operand register in performing an operation involving at least one a data value from the data store.

3. A processor according to claim 2, wherein the computational unit comprises a control logic unit for examining the trivial operand register and controlling the operation of a calculation unit.

4. A processor according to claim 1, wherein the data values are floating point values.

5. A processor according to claim 1, wherein the data store comprises 32 bit, 64 bit or 128 bit registers.

6. A processor according to claim 1, wherein the trivial operand comprises a 0, −1 or 1.

7. A processor according to claims 1, wherein the trivial operand is uniquely a 0 value.

8. A processor according to anyone of claims 1, wherein the performed instruction comprises a floating point calculation.

9. A processor according to claim 8, wherein a control logic unit is provided for examining the trivial operand register and controlling the operation of a floating point calculation unit.

10. A processor according to claim 9, wherein the control logic unit is configured to bypass the floating point calculation unit and provide a result directly where the calculation involves a trivial operand.

11. A processor according to claim 10, wherein the result is provided directly by setting the trivial operand register flag for the register where the result was to be stored.

12. A processor according to claims 1, wherein the performed instruction comprises a data storage instruction.

13. A processor according to claims 1, wherein the processor further comprises a comparator configured to perform comparisons of non-zero patterns corresponding to vector or matrix data.

14. A method for performing operations on a first data register in a processor, the processor having a trivial operand register indicating the presence of a trivial operand in the first data register comprising the steps of:
   employing a flag in the trivial operand register in the performance of an instruction involving said first data register,
   further comprising the initial steps of:
   a) writing data to a first data register,
   b) performing a comparison of the data to determine the presence of a trivial operand in the data, wherein the comparison is performed within a plurality of comparators, wherein each of the comparators is connected directly to a corresponding write port on an input line of the first data register, and
   c) setting the flag in response to the comparison within the trivial operand register,
   wherein the step of writing the data and performing the comparison are performed simultaneously.

* * * * *